United States Patent
Godbersen

Patent Number: 5,785,471
Date of Patent: Jul. 28, 1998

[54] SKI BAR TIE DOWN DEVICE FOR A SNOWMOBILE TRAILER

[76] Inventor: Byron L. Godbersen, Lake LaJune Estates, Ida Grove, Iowa 51445

[21] Appl. No.: 790,059

[22] Filed: Jan. 28, 1997

[51] Int. Cl.$^6$ ........................................ B60P 7/08
[52] U.S. Cl. ............... 410/3; 410/2; 410/7; 410/8; 410/11; 410/12
[58] Field of Search ............... 410/2, 3, 4, 7, 410/8, 9, 10, 11, 12, 19, 23, 77; 248/500, 503; 224/403, 536, 917.5

[56] References Cited

U.S. PATENT DOCUMENTS

| | | | |
|---|---|---|---|
| 3,656,212 | 4/1972 | Velte | 248/500 X |
| 3,885,690 | 5/1975 | Van Slambrouck | 410/3 X |
| 4,369,009 | 1/1983 | Fulford | 410/12 X |
| 4,960,353 | 10/1990 | Thorndyke | 410/10 X |
| 5,044,845 | 9/1991 | Baker, Jr. | 410/3 |
| 5,203,655 | 4/1993 | Persau | 410/3 |
| 5,607,270 | 3/1997 | Zimmerman | 410/3 |

FOREIGN PATENT DOCUMENTS

| | | | |
|---|---|---|---|
| 2-6244A | 1/1990 | Japan | 410/2 |

OTHER PUBLICATIONS

Copy—2 pages of brochure for Yacht Club Snowmobile Trailers, undated by Yacht Club Trailers, Manufactured by Hawkeye Leisure Trailers, Ltd.

Copy—1 page of brochure entitled 1997 Spartan Snowmobile Trailer, Humbolt, IA Specifications by Spartan Products, Inc., West Paul, MN.

*Primary Examiner*—Stephen Gordon
*Attorney, Agent, or Firm*—Henderson & Sturm

[57] ABSTRACT

A device for releasably holding down the skis of a snowmobile onto the floor of a flatbed trailer comprising a U-shaped channel, with a plurality of longitudinally spaced openings formed therein for adjustably receiving longitudinally spaced members, a handle pivotally connected to the channel for drawing tight in an over-center manner a strap entrained over and under the members, and an elongated tube placeable over the channel and under the strap, the tube ends of which engage and hold skis upon pivotal rotation of the handle in one direction effecting a tightening of the strap over the tube, opposite rotation of the handle loosening the strap such that the tube can be removed from over the skis.

7 Claims, 1 Drawing Sheet

SKI BAR TIE DOWN DEVICE FOR A SNOWMOBILE TRAILER

BACKGROUND OF THE INVENTION

The present invention relates generally to trailers for transporting one or more snowmobiles, and particularly to a device for tieing or holding down the skis of a snowmobile onto the floor of the trailer for maintaining the snowmobile in a stationary condition on the trailer.

Personal snowmobiles are normally transported on a wheeled trailer having a square or rectangular frame with a flat floor, usually wood, of a size to support one or more snowmobiles. The floor or bed size may vary from 4'×8' for one sled, to 8'×8' for a pair of snowmobiles arranged side-by-side, up to 8'×28' for carrying up to six sleds again arranged in pairs. The beds may tilt or ramps, fore and aft as desired, may be provided for driving each snowmobile onto the floor of the trailer.

Other than the size of the trailer floor, the position of the snowmobile on the floor is determined by the location of a device attached to the floor for holding or tieing down the two long, flat skis of each snowmobile onto the floor. A contemporary device includes: an elongated bar or tube of a length to extend over both skis of a conventional snowmobile; and a threaded, rotatable shaft with a crank handle at one end, with the shaft insertable through the center of the bar for threaded insertion into a receiving nut or the like fitted in a stationary manner in the trailer floor.

In use, with the snowmobile in place, the bar is placed such that its opposite ends cover the two skis, normally at their front ends. The shaft, already inserted through the bar, is then threaded into the nut by rotation of the handle, this requiring a certain degree of searching or aligning movement of the bar to place the shaft end directly over the nut, the handle having a flange engaging and forcing the bar downwardly toward the floor upon downward threading movement of the handle. Continued rotation of the handle thus tightens the bar downwardly against the skis such that the skis are held in a stationary manner onto the trailer floor.

Other similar versions of this contemporary device are available; one, for example, having a longitudinal slot formed in the floor for the nut or like threaded receiver to slide within which provides for a longitudinal adjustment of the tie down bar relative to the floor.

The disadvantages of these arrangements include, for example, the frustration of hunting for the small receiving hole or nut within which to insert the threaded shaft, then lining up the two and effecting a threaded mating. This "hunting" requirement with somewhat heavy and awkward metal parts, plus standing over or to one side of the snowmobile is difficult under the best of weather conditions, but under the normal ice and snow conditions most conducive to pleasurable snowmobiling, such a requirement becomes most difficult and time consuming.

It is to a solution of the problems created by the contemporary snowmobile tie down device that this invention is directed.

BRIEF SUMMARY OF THE INVENTION

The present invention comprises an elongated channel having a flat base for attachment to the floor of the trailer, the channel extended longitudinally of the trailer and placed equidistantly between the sides of a single place trailer so as to be straddled by the skis of a snowmobile when placed on the trailer for transportation or storage, as the case may be.

The channel sides are provided with a plurality of longitudinally spaced, laterally or transversely aligned openings for adjustable placement of a first transversely extended member adjacent the rear end of the channel, a second transversely extended member forwardly of the first member, and a third member comprising a laterally spaced pair of projections pivotally connected to the sides, again of the second member. The projections may be integral with the spaced ends of a U-shaped handle such that the handle can be manually pivoted arcuately along a transverse axis about its projections pivotal connections and within a vertical plane longitudinally of the channel, the pivoting being toward and away from the trailer bed floor. The second and third members have their axes disposed within a common normally horizontal plane extended parallel the plane of the channel base.

A fourth member is transversely extended between the sides of the handle such that when the handle is in a raised position, the fourth member is both forward—toward the front of the trailer, and above the second member, and when the handle is in a lowered position with the closed end engaging the floor, the fourth member is both forward and below the second member. An elongated strap has one end attached to the fourth member, with the strap trained between the third member projection connections, disposed below the second member, and having a hook at the other end for detachable connection to the first member.

An elongated tube has a length such that when its middle portion is placed on top of the channel sides, with the tube extended transversely of the trailer floor, the ends of the tube are disposed over the snowmobile skis. With the handle in a normally manually raised condition such that the strap is loose, the strap hook is placed over the tube middle portion and the hook is connected to the first member. Manual movement of the handle pivotally downwardly toward the floor then results in moving the fourth member to a position just below an imaginary line from the underside of the second member, under which the strap is trained, and through the center of the third member pivotal connections, or "over-center", such that the strap is held taut over the tube, thus holding down the snowmobile skis. In this position, the closed end of the handle engages the floor, thereby retaining the tautness of the strap.

To release the device the handle is merely manually, for example, lifted and rotated about its pivotal connections to place the fourth member and the strap end "above" the imaginary line, thus reducing the distance between the fourth member and the second member, whereby to loosen the tautness of the strap such that the tube can be pulled out from under the strap, or such that the hooked strap end can be detached from the first member and the tube removed.

DETAILED DESCRIPTION OF THE INVENTION

Figure 1:
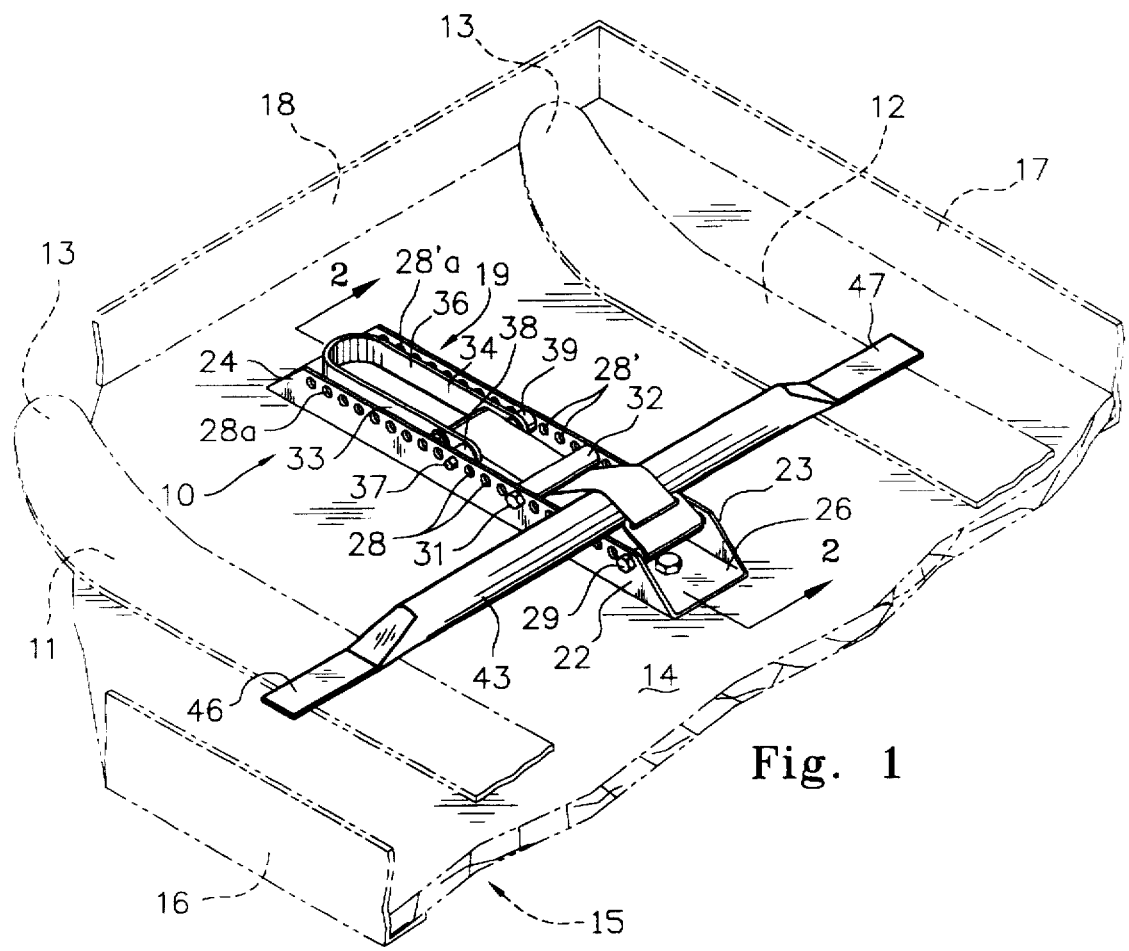
FIG. 1 is a fragmentary perspective view of the bed of a snowmobile trailer showing a device mounted on the floor of the trailer for temporarily holding down the two skis of a snowmobile, the latter not shown.
Figure 2:
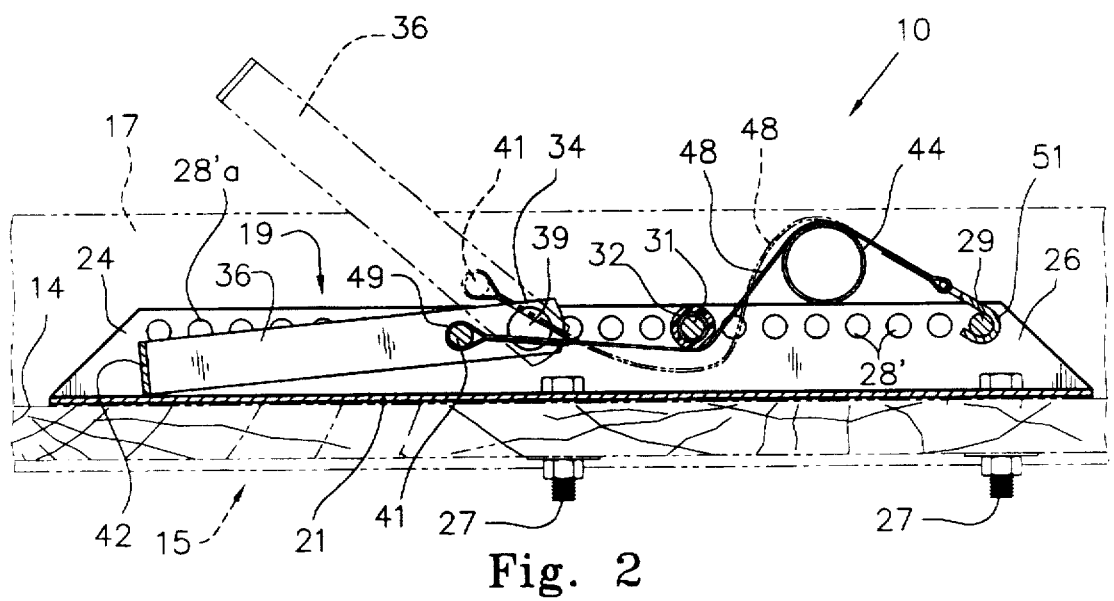
FIG. 2 is an enlarged, vertical sectional view of the ski tie down device as taken along the line 2—2 in FIG. 1.

Referring now to the drawings, the ski bar tie down device of this invention is illustrated generally at (10) in FIGS. 1 and 2. The device (10) holds down the two long, flat skis (11), (12) adjacent their forward, upwardly curved ends (13) which are part of a conventional snowmobile (not shown). The skis (11), (12) are held flat against a flat floor (14) of a trailer bed (15), the bed (15) having upright sides (16), (17) with a front panel (18). The remainder (not shown) of the trailer includes a wheel and axle assembly and a tongue for attachment to a prime mover for towing the trailer. The trailer may be tilted about the wheel and axle assembly to place the rear end on the ground or pavement, or the trailer can be provided with front and/or rear ramps, both arrangements providing for driving the snowmobile onto the bed (15) for transportation or other purposes.

The device (10) comprises an elongated channel (19) having a flat base (21) and laterally or transversely spaced, upright sides (22), (23), the channel (19) having a front end (24) and a rear end (26). The channel (19) is placed with its longitudinal axis extended longitudinally of the trailer bed (15) and at a lateral location between the sides (16), (17) approximately midpoint between where the skis (11), (12) of the snowmobile are expected to be located after the snowmobile has been driven onto the bed (15).

For a trailer carrying a single snowmobile as shown in FIG. 1, the device (10) would be placed at midpoint between the sides (16), (17) as illustrated; and were the trailer to carry a pair of snowmobiles side-by-side, a pair of devices (10) would be placed on the floor (14) in transverse alignment, each device (10) being spaced inwardly from an adjacent side a quarter of the width of the floor (14). The placement of a device longitudinally of the trailer bed (15) is determined by the user, but such that the front and rear of each snowmobile is located within the confines of the trailer front, sides and rear. Once located, the device (10) is fastened to the floor (14) by a pair of fasteners (27) (FIG. 2) inserted through openings provided therefor in the base (21) and extended through the wooden floor (14).

To provide for longitudinal adjustment capabilities of the device (10), a plurality of transversely aligned, longitudinally spaced pairs of openings (28), (28') (FIG. 1) are formed in the channel sides (22), (23), respectively. A first member such as a bolt (29) is connected to and extended transversely between the sides (22), (23) by being inserted through a pair of openings (28), (28') adjacent the rear end (26) of the channel (19), and a second member such as another bolt (31) is also connected to and extended transversely between the sides (22), (23) by being inserted through another pair of openings (28), (28') such that the second member (31) is disposed forwardly on the channel of the first member (29). A bushing (32) of nylon or the like embraces the second member (31) for a purpose hereinafter described.

A third transverse member is provided for pivotally holding the laterally spaced free ends (33), (34) (FIG. 1) of a U-shaped handle (36), the third member being an outwardly extended projection (37) formed on each free end (33), (34) and removably inserted in one of the openings (28), (28') such that the handle (36) may freely pivot relative to the channel (19) about transversely aligned openings (28), (28'). A bushing (38), (39) is provided for each projection (37) between a free end (33), (34) and an adjacent side (22), (23) of the channel (19).

The handle (36) pivots arcuately toward and away from the channel (19) as best shown in FIG. 2. The handle (36) includes a fourth transversely extended bolt (41) which extends between the free ends (33), (34) slightly forwardly of the projections (37) as is shown in FIG. 2, toward the closed end (42) of the handle (36). As shown in FIG. 1, the handle width, extending between elements 33 and 34, is less than the spacing between the channel sides.

Working in cooperation with the channel (19), an elongated tube (43) is provided which, when its center portion (44) is placed on top of the channel sides (22), (23) (FIG. 2), the outer ends (46), (47) extend sufficiently laterally of the channel (19) to extend over the skis (11), (12).

A cloth or like strap (48) has one end (49) secured to the fourth bolt (41), with the strap (48) then trained past the projections (37) and between the handle free ends (33), (34), underneath the second member bushing (32), over the tube center portion (44), and has a hook (51) at the rearward end. As shown in FIG. 1, the strap width is less than the transverse spacing between the handle elements 33 and 34.

In use, the first and second bolts (29), (31) are inserted through aligned pairs (28), (28') of openings in longitudinally spaced relation sufficient that the tube (43) can be inserted between the strap (48) and the channel as shown in FIG. 2. The handle projections (37) are also inserted within a pair of openings (28), (28') spaced forwardly of the second bolt (31) such that, with the hook (51) attached to the first bolt (29), upon a counterclockwise pivoting movement of the handle (36) about the projections (37) as viewed in FIG. 2, when the transverse axis of the handle fourth bolt (41) is rotated to a position just below an imaginary line from the underside of the second bolt (31) through the center or axis of the third member - the projections (37), the strap (48) will be held and retained in a taut condition.

This arrangement provides for holding down the tube (43) against the channel (19) which in turn holds down the skis (11), (12) by the tube ends (46), (47). It will be noted that in this "over-center" position of the handle (36), the closed end (42) of the handle (36) engages and is held tightly against the channel base (21), and of course the handle (36) is held against unaided clockwise movement. To release the tightly held tube (43), the handle (36) is merely pivoted clockwise as viewed, back "over-center" as illustrated in dash lines in FIG. 2, such that the strap (48) is loose and the hook (51) can be released, the tube (43) then being free for removal from the skis (11), (12).

It is readily observed that with the plurality of openings (28), (28'), longitudinal adjustment of the position of the tube relative to the skis (11), (12) is provided. Additionally, the vertical spacing of the openings (28), (28') forwardly, for example of openings (29a), (28'a) (FIG. 2) above the base (21) may be decreased to provide for a harder, more positive move of the handle (36) as it slams against the channel base (21).

Accordingly, it will be appreciated that the preferred method disclosed herein does indeed accomplish the aforementioned objects. Obviously many modifications and variations of the present invention are possible in light of the above teachings. It is therefore to be understood that, within the scope of the appended claims, the invention may be practiced otherwise than as specifically described.

What is claimed is:

1. A device for holding down the two skis of a snowmobile onto the floor of a snowmobile trailer comprising:

an elongated U-shaped channel having a base and a pair of upright sides, said channel having opposed ends, said base having one or more openings formed therein for the insertion of fasteners therethrough;

a first member connected transversely between said sides adjacent one said channel end;

a second member connected transversely between said sides and spaced toward the opposite said channel end from said first member;

a third member connected to said sides, extended transversely thereof and spaced toward said opposite end from said first member;

an elongated handle having opposed ends, one said handle end thereof pivotally connected at said third member for pivotal movement longitudinally of said channel and arcuately toward and away from said base, said handle having a fourth member connected thereto and extended transversely between laterally spaced elements of said one handle end;

an elongated tube having opposed ends placeable at its approximate center on said sides and extended transversely of said channel with its tube ends each disposed above a respective ski; and a strap having opposed ends, one said strap end connected to said fourth member, said strap adapted to extend from said fourth member past said third member, beneath said second member, over said tube center and with said opposite strap end connected to said first member, said handle pivotally movable downwardly from a raised first position with said fourth member spaced above an imaginary line between the underside of said second member and the center of said third member to a lowered second position with said fourth member spaced slightly below said imaginary line, said handle engaging said channel base in said second position, thereby preventing further pivotal downward movement of said handle.

2. The hold down device of claim 1, and further wherein said sides each have a plurality of openings formed in longitudinally spaced relation therein, respective said openings of said sides being transversely aligned in pairs whereby to receive said first, second and third members, each of said, first, second, and third members adjustably movable from one to another of said transversely aligned pairs of openings.

3. The hold down device of claim 2, and further wherein said one handle end is open and said other handle end is closed, said handle having a U-shape with said laterally spaced elements at said open end, said elements each pivotally connected at said third member to a respective said channel side opening, with said elements in transverse alignment between said channel sides, and further wherein said strap has a width less than the transverse spacing between said spaced handle.

4. The hold down device of claim 1, and further wherein said one handle end is open and said other handle end is closed, said handle having a U-shape with said laterally spaced elements at said open end, said channel including opposed side openings, said elements each pivotally connected at said third member to a respective said channel side opening, whereby said elements are in transverse alignment between said channel sides.

5. The hold down device of claim 3, and further wherein said strap has a width less than the transverse spacing between said spaced handle elements.

6. The hold down device of claim 1, and further wherein said handle has a width less than the spacing between said channel sides.

7. The hold down device of claim 1, and further wherein said opposite end of said strap has a hook attached thereto for detachable connection to said first member.

* * * * *